(12) United States Patent
Ishiura et al.

(10) Patent No.: US 9,441,684 B2
(45) Date of Patent: Sep. 13, 2016

(54) PARKING LOCK DEVICE FOR VEHICLE

(71) Applicant: Toyota Jidosha Kabushiki Kaisha, Toyota-shi Aichi-ken (JP)

(72) Inventors: Kazuaki Ishiura, Okazaki (JP); Michitaka Tsuchida, Miyoshi (JP); Tatsuo Obata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/611,355

(22) Filed: Feb. 2, 2015

(65) Prior Publication Data

US 2015/0226277 A1    Aug. 13, 2015

(30) Foreign Application Priority Data

Feb. 7, 2014    (JP) .................................. 2014-022108

(51) Int. Cl.
| B62C 7/02 | (2006.01) |
|---|---|
| F16D 63/00 | (2006.01) |
| F16D 121/14 | (2012.01) |

(52) U.S. Cl.
CPC ......... F16D 63/006 (2013.01); *F16D 2121/14* (2013.01)

(58) Field of Classification Search
CPC .. F16D 65/16; F16D 2121/14; F16D 63/006; F16H 61/22; F16H 63/3416; F16H 63/3425; F16H 63/3441; B60T 1/005
USPC ............ 188/69, 31, 265; 192/215, 218, 219, 192/219.4, 219.5, 220.2
See application file for complete search history.

(56) References Cited

U.S. PATENT DOCUMENTS

| 4,606,242 | A | * | 8/1986 | Hasegawa | B60T 1/005 74/577 S |
|---|---|---|---|---|---|
| 8,240,448 | B2 | * | 8/2012 | Hongawara | B60T 1/005 188/31 |
| 8,720,660 | B2 | * | 5/2014 | Kimura | B60T 1/005 192/219.5 |
| 2007/0062779 | A1 | * | 3/2007 | Kusamoto | F16H 63/3425 192/219.5 |
| 2010/0108460 | A1 | * | 5/2010 | Nakamura | F16H 63/3416 192/219.5 |
| 2013/0134010 | A1 | * | 5/2013 | Kimura | B60T 1/005 192/219.5 |
| 2014/0155214 | A1 | * | 6/2014 | Kimura | F16H 57/0447 475/160 |

FOREIGN PATENT DOCUMENTS

| JP | 0613970 U | 2/1994 |
|---|---|---|
| JP | 0924805 A | 1/1997 |
| JP | 2007-083843 A | 4/2007 |
| JP | 2012-035750 A | 2/2012 |
| JP | 2013-151981 A | 8/2013 |

\* cited by examiner

*Primary Examiner* — Pamela Rodriguez
(74) *Attorney, Agent, or Firm* — Dinsmore & Shohl LLP

(57) ABSTRACT

A parking pawl achieves a parking locked state by engaging with a parking gear. A parking rod is configured to move along the axial direction of the parking rod. The parking rod passes through a cam member. The cam member is configured to move from a first position to a second position in accordance with movement of the parking rod. The cam member includes a tapered portion that presses the parking pawl such that the parking pawl is engaged with the parking gear when the cam member moves from the first position to the second position. The parking rod includes a protruding portion that protrudes from the cam member. A guide member is configured to guide the cam member, and is configured to support the protruding portion and the tapered portion when the cam member is at the first position.

6 Claims, 2 Drawing Sheets

PARKING LOCK DEVICE FOR VEHICLE

INCORPORATION BY REFERENCE

The disclosure of Japanese Patent Application No. 2014-022108 filed on Feb. 7, 2014 including the specification, drawings and abstract is incorporated herein by reference in its entirety.

BACKGROUND OF THE INVENTION

1. Field of the Invention

The invention relates to a parking lock device for a vehicle.

2. Description of Related Art

For example, Japanese Patent Application Publication No. 2013-151981 (JP 2013-151981 A) describes a technology related to a conventional parking lock device for a vehicle. JP 2013-151981 A discloses a control apparatus for a continuously variable transmission (CVT) disposed in a vehicle in order to reduce an impact that occurs in a parking lock mechanism when shifting means is switched from a movable position to a parking position.

The control apparatus for the continuously variable transmission disclosed in JP 2013-151981 A includes the parking lock mechanism that is switchable between a restricted state in which the rotation of drive wheels is restricted and a movable state in which the rotation of the drive wheels is permitted. The parking lock mechanism includes a parking rod, a parking cam, a cam guide, and a parking pawl. The parking cam is disposed on the parking rod so as to be slidable relative to the parking rod. The parking cam is supported by the cam guide so as to be slidable in the axial direction of the parking rod. The parking pawl is provided with an engagement protrusion that is engageable with a parking gear, and the parking pawl is urged in a direction away from the parking gear by elastic force of a return spring.

When the parking cam enters the cam guide in response to actuation of the parking lock mechanism, the parking cam presses the parking pawl. Thus, the parking pawl moves to approach the parking gear against the elastic force of the return spring. As a result, the engagement protrusion is engaged with the parking gear, and thus the parking gear is locked.

In the parking lock mechanism disclosed in JP 2013-151981 A, the parking cam is provided with a tapered portion, along which the parking pawl moves to approach the parking gear. In the movable (unlocked) state in which the rotation of the drive wheels is permitted, the tapered portion and the cam guide are in contact with each other, so that the parking cam is supported.

SUMMARY OF THE INVENTION

However, in this configuration, the parking cam is supported by the cam guide, at a single point of the tapered portion. Thus, for example, when vibrations of the vehicle are transmitted through the parking pawl to the parking cam, the parking cam may hit the cam guide. In this case, dents may be made in the parking cam and the cam guide. This makes it difficult to ensure sufficient durability of these components.

The invention provides a parking lock device for a vehicle, in which sufficient durability of the components is ensured.

A first aspect of the invention relates to a parking lock device for a vehicle. The vehicle includes a parking gear, a parking pawl, a parking rod, a cam member, and a guide member. The parking pawl achieves a parking locked state by engaging with the parking gear. The parking rod is configured to move along an axial direction of the parking rod. The parking rod passes through the cam member. The cam member is configured to move from a first position to a second position in accordance with movement of the parking rod. The cam member includes a tapered portion that presses the parking pawl such that the parking pawl is engaged with the parking gear when the cam member moves from the first position to the second position. The parking rod includes a protruding portion that protrudes from the cam member. The guide member is configured to guide the cam member. The guide member is configured to support the protruding portion and the tapered portion when the cam member is at the first position.

According to the above-described aspect, in an unlocked state where the cam member is at the first position, the protruding portion and the tapered portion are supported by the guide member. Thus, even when vibrations of the vehicle are transmitted to the cam member, the cam member is hindered from hitting the guide member. Thus, the parking lock device, in which sufficient durability of the components is ensured, is provided.

In the above-described aspect, when the cam member is at the first position, a distal end of the protruding portion may be supported by the guide member.

According to the above-described aspect, in the unlocked state where the cam member is at the first position, the distal end of the protruding portion and the tapered portion are supported by the guide member. Thus, even when vibrations of the vehicle are transmitted to the cam member, the cam member is hindered from hitting the guide member.

In the above-described aspect, the guide member that supports the protruding portion may be subjected to heat treatment. According to the above-described aspect, the heat treatment imparts a high hardness to the portion of the guide member that supports the protruding portion. Thus, it is possible to ensure sufficient durability of the guide member.

In the above-described aspect, the guide member may include a straight portion extending along the axial direction of the parking rod and a support portion that is disposed side-by-side with the straight portion in the axial direction of the parking rod. The support portion may support the protruding portion and the tapered portion when the cam member is at the first position. Further, the support portion may be higher in hardness than the straight portion.

According to the above-described aspect, the protruding portion and the tapered portion are supported by the support portion with a relatively high hardness, and meanwhile, when vibrations of the vehicle are transmitted to the cam member, the cam member is hindered from hitting the straight portion with a relatively low hardness.

In the above-described aspect, the parking lock device for a vehicle may further include a collar fitted onto an outer periphery of the protruding portion. The collar may be fixed to the parking rod by welding.

According to the above-described aspect, the hardness of the protruding portion is increased by welding the collar. Thus, it is possible to ensure sufficient durability of the parking rod.

According to the above-described aspects, the parking lock device for a vehicle, in which sufficient durability of the components is ensured, is provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
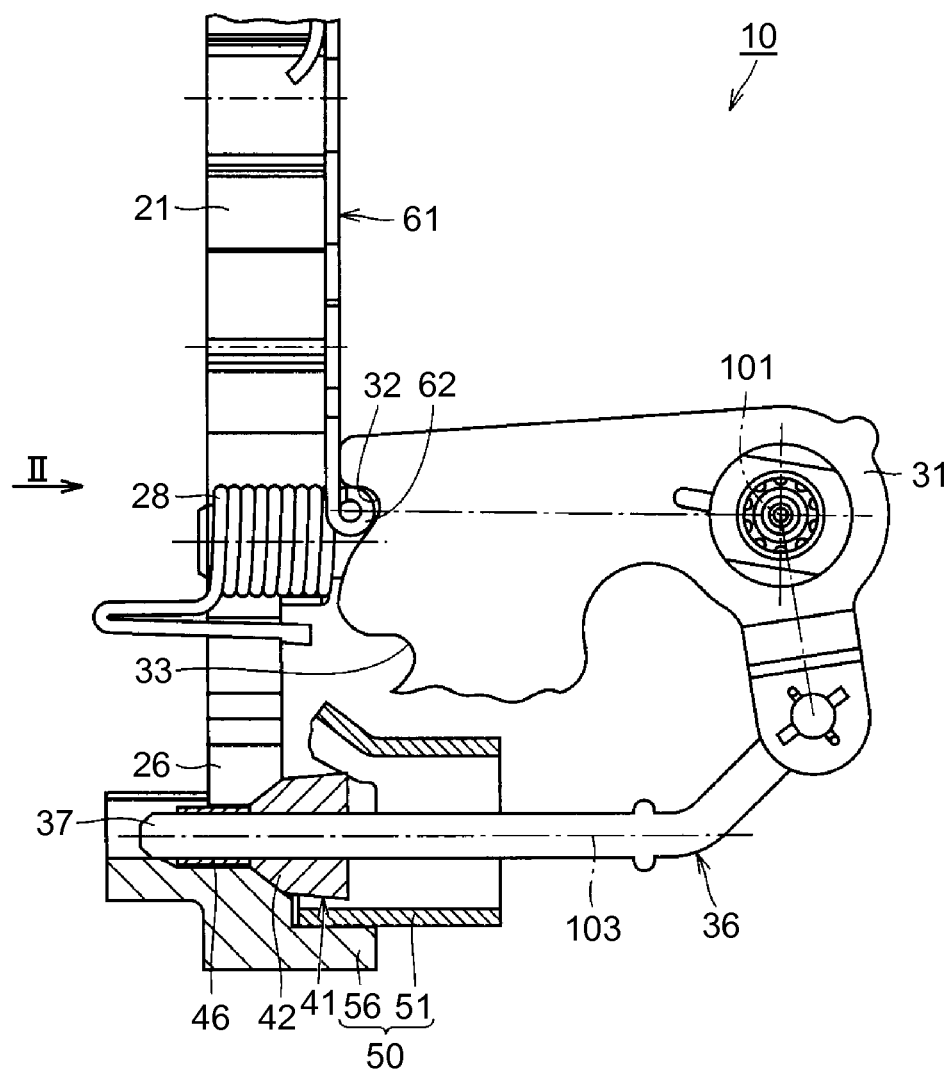
FIG. 1 is a view showing a parking lock device for a vehicle according to an embodiment of the invention.

Hereinafter, example embodiments of the invention will be described with reference to the accompanying drawings. Note that, in the drawings referenced in the following description, the same reference numerals are assigned to the same or equivalent members.

Figure 2:
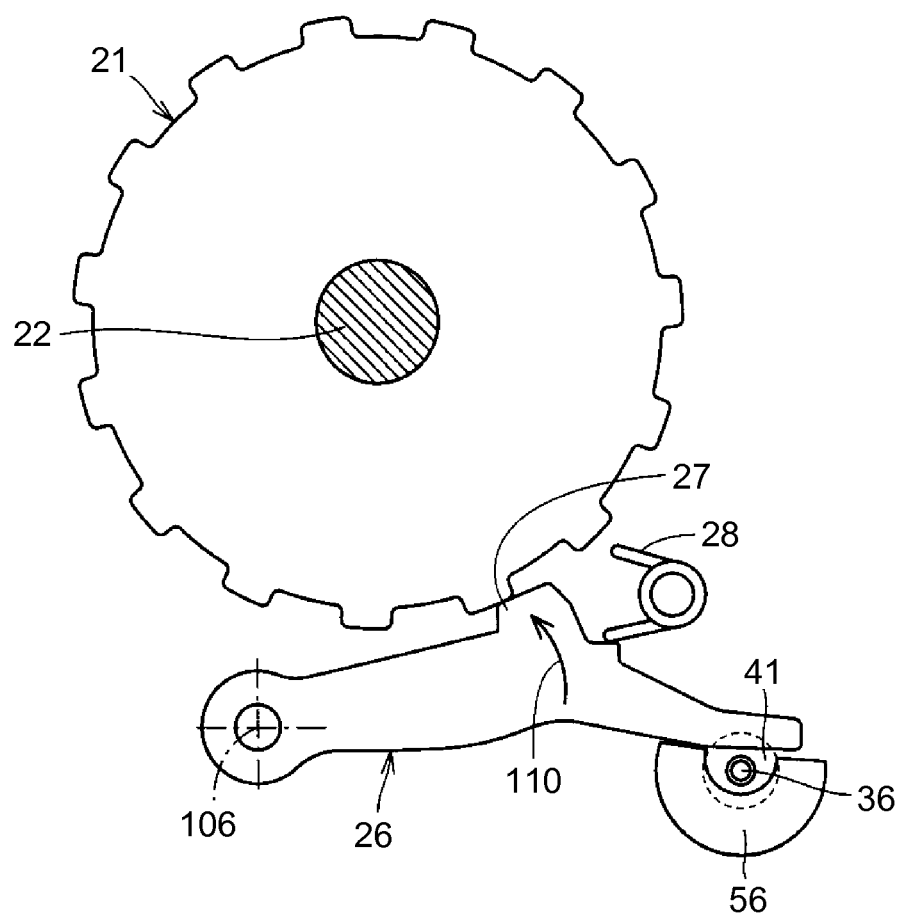
FIG. 2 is a view showing the parking lock device for a vehicle when viewed from a direction shown by an arrow II in FIG. 1.

FIG. 1 is a view showing a parking lock device for a vehicle in an embodiment of the invention. FIG. 2 is a view showing the parking lock device for a vehicle when viewed from a direction shown by an arrow II in FIG. 1.

Referring to FIG. 1 and FIG. 2, a parking lock device 10 for a vehicle according to this embodiment is a device used to achieve the locked state of drive wheels of the vehicle. The parking lock device 10 for a vehicle includes a parking gear 21, a parking pawl 26, and a return spring 28.

The parking gear 21 is disposed so as to be rotatable about a rotation shaft 22 of the parking gear 21. The parking lock device 10 for a vehicle is connected to a power transmission device of the vehicle, and the parking gear 21 rotates together with a drive gear in the power transmission device. The parking pawl 26 is engaged with the parking gear 21, thereby restricting the rotation of the drive gear in the power transmission device. At this time, the locked state of the drive wheels of the vehicle is achieved.

The parking pawl 26 is disposed so as to be pivotable about a virtual shaft center 106. The shaft center 106 extends in a direction parallel to the axial direction of the rotation shaft 22 of the parking gear 21. The parking pawl 26 has an engagement protrusion 27 at a position apart from the shaft center 106. The engagement protrusion 27 is a component part of the parking pawl 26. The return spring 28 applies elastic force to the parking pawl 26 such that the engagement protrusion 27 is positioned apart from the parking gear 21.

When the parking pawl 26 is pressed by a parking cam 41 (described later), the parking pawl 26 pivots, against the elastic force of the return spring 28, in such a direction that the engagement protrusion 27 approaches the parking gear 21 (i.e., a direction shown by an arrow 110 in FIG. 2). At a pivot end of the parking pawl 26, the engagement protrusion 27 is engaged with the parking gear 21. As a result, the rotation of the parking gear 21 is restricted.

The parking lock device 10 for a vehicle further includes a detent spring 61, a detent plate 31, a parking rod 36, the parking cam 41, a collar 46, and a guide member 50.

The detent plate 31 is disposed so as to be pivotable about a virtual shaft center 101. The shaft center 101 extends in a direction perpendicular to the axial direction of the rotation shaft 22 of the parking gear 21. The detent plate 31 is in the form of a plate. The detent plate 31 is in the form of a plate extending within a plane perpendicular to the shaft center 101. The detent plate 31 has a recessed portion 32 and a recessed portion 33. The recessed portion 32 and the recessed portion 33 are recessed from a peripheral edge of the detent plate 31 in the form of a plate. The recessed portion 32 and the recessed portion 33 are located adjacent to each other in the circumferential direction around the shaft center 101.

The detent spring 61 is composed of a leaf spring. The detent spring 61 is in the form of a plate extending from a support end thereof toward the detent plate 31. The detent spring 61 has an end portion 62 as a component part of the detent spring 61. The end portion 62 is provided at a distal end of the detent spring 61 extending toward the detent plate 31. The detent plate 31 is rotated about the shaft center 101 by the power transmitted from an actuator (not shown). At this time, a switchover is made between an unlocked state where the end portion 62 is engaged with the recessed portion 32 and a locked state where the end portion 62 is engaged with the recessed portion 33.

The parking rod 36 has such a shape as to extend from the detent plate 31 and extend linearly along a virtual centerline 103 (hereinafter, a direction along the centerline 103 will also be referred to as "axial direction of the parking rod 36"). The parking rod 36 extends from the detent plate 31 in a direction toward the parking pawl 26. The parking rod 36 is disposed so as to be movable along the axial direction of the parking rod 36 in accordance with the rotation of the detent plate 31.

The parking rod 36 is disposed so as to pass through the parking cam 41 on an axis extending linearly along the centerline 103. The parking rod 36 has a protruding portion 37 that is a component part of the parking rod 36. The protruding portion 37 is provided at such a position as to protrude from the parking cam 41 in the axial direction of the parking rod 36. The parking rod 36 is made of metal.

The collar 46 has a cylindrical shape. The collar 46 is fitted onto the outer periphery of the protruding portion 37 of the parking rod 36. The collar 46 is disposed side-by-side with the parking cam 41 in the axial direction of the parking rod 36. The collar 46 is disposed on a side farther than the parking cam 41 when viewed from a position where the parking rod 36 extends from the detent plate 31. The collar 46 is made of metal. The collar 46 is fixed to the parking rod 36 by welding.

The parking cam 41 has a tapered portion 42 as a component part of the parking cam 41. The tapered portion 42 is adjacent to the collar 46 in the axial direction of the parking rod 36. The tapered portion 42 extends in a direction oblique to the axial direction of the parking rod 36. The parking cam 41 is made of metal. The parking cam 41 is subjected to heat treatment. The parking cam 41 has a hardness higher than that of a cam guide 51 (described later).

The guide member 50 is disposed so as to guide the parking cam 41 that moves in accordance with the rotation of the detent plate 31. The guide member 50 is disposed on the outer periphery of the parking rod 36. The guide member 50 has a split structure including a cam guide 51 as a straight portion, and a sleeve 56 as a support portion.

The cam guide 51 extends along the axial direction of the parking rod 36. The cam guide 51 is made of metal.

The sleeve 56 is disposed side-by-side with the cam guide 51 in the axial direction of the parking rod 36. The sleeve 56 is disposed on a side farther than the cam guide 51 when viewed from the position where the parking rod 36 extends from the detent plate 31. The sleeve 56 has a circular arc shape when viewed from the axial direction of the parking rod 36. When viewed from the axial direction of the parking rod 36, the sleeve 56 is disposed vertically below the parking rod 36, and the parking pawl 26 is disposed vertically above the parking rod 36.

The sleeve 56 is made of metal. Only the sleeve 56 out of the cam guide 51 and the sleeve 56 is subjected to heat treatment. The sleeve 56 has a hardness higher than that of the cam guide 51.

When the detent plate 31 rotates clockwise about the shaft center 101, the parking rod 36 moves in such a direction that the parking cam 41 approaches the parking pawl 26. On the other hand, when the detent plate 31 rotates counterclockwise about the shaft center 101, the parking rod 36 moves in such a direction that the parking cam 41 moves away from the parking pawl 26. At this time, the parking cam 41 moves between a non-pressing position where the unlocked state is achieved (i.e., a position shown in FIG 1) and a pressing position where the locked state is achieved.

When the parking cam 41 moves from the non-pressing position to the pressing position, the tapered portion 42 of the parking cam 41 presses the parking pawl 26 toward a position where the parking pawl 26 is engaged with the parking gear 21.

When the parking cam 41 is at the non-pressing position (unlocked state), the protruding portion 37 and the tapered portion 42 are supported by the guide member 50. Particularly in this embodiment, a distal end of the protruding portion 37 that protrudes from the parking cam 41 is supported by the guide member 50. The protruding portion 37 and the tapered portion 42 are supported by the sleeve 56. The parking cam 41 is disposed in a non-contact state where the parking cam 41 is not in contact with the cam guide 51.

As described above, in the parking lock device 10 for a vehicle according to this embodiment, when the parking cam 41 is at the non-pressing position, two points, that is, the protruding portion 37 and the tapered portion 42, are supported by the guide member 50. Therefore, even when, for example, vibrations of an engine of the vehicle are transmitted to the parking pawl 26, it is possible to restrict occurrence of a phenomenon in which the parking cam 41 hits the guide member 50. Thus, it is possible to ensure sufficient durability of the parking cam 41 and the guide member 50.

In this case, the distal end of the protruding portion 37 that protrudes from the parking cam 41 is supported by the guide member 50. With this configuration, the span between the two support points is long, and thus it is possible to support the parking cam 41 more stably. Moreover, the protruding portion 37 and the tapered portion 42 are supported by the sleeve 56 that constitutes the guide member 50. A high hardness is imparted to the sleeve 56 by subjecting the sleeve 56 to the heat treatment, and thus sufficient durability of the sleeve 56 is ensured. Moreover, the collar 46 fitted onto the protruding portion 37 is fixed to the parking rod 36 by welding. The hardness of the protruding portion 37 is increased by the welding, and thus sufficient durability of the parking rod 36 is also ensured.

The above-described configuration of the parking lock device 10 for a vehicle in the embodiment of the invention will be summarized below. The parking lock device 10 for a vehicle in this embodiment includes: the parking pawl 26 that achieves the locked state by engaging with the parking gear 21; the parking rod 36 that is movable in the axial direction; the parking cam 41 through which the parking rod 36 passes, and which serves as a cam member that moves from the non-pressing position as a first position to the pressing position as a second position in accordance with the movement of the parking rod 36; and the guide member 50 disposed so as to guide the parking cam 41. The parking rod 36 has the protruding portion 37 that protrudes from the parking cam 41. The parking cam 41 has the tapered portion 42 that presses the parking pawl 26 toward the position where the parking pawl 26 is engaged with the parking gear 21 when the parking cam 41 moves from the non-pressing position to the pressing position. When the parking cam 41 is at the non-pressing position, the protruding portion 37 and the tapered portion 42 are supported by the guide member 50.

With the thus configured parking lock device 10 for a vehicle in the embodiment of the invention, even when vibrations of the vehicle are transmitted to the parking lock device, it is possible to ensure sufficient durability of the parking cam 41 and the guide member 50.

The embodiment of the invention that has been disclosed in the specification is to be considered in all respects as illustrative and not restrictive. The technical scope of the invention should be defined by claims instead of the above description, and all changes which come within the meaning and range of equivalency of the claims are therefore intended to be embraced therein.

The invention is mainly applied to the parking lock device for a vehicle, which is used to achieve the locked state of the drive wheels of the vehicle.

What is claimed is:

1. A parking lock device for a vehicle, the parking lock device comprising:
    a parking gear;
    a parking pawl that achieves a locked state by engaging with the parking gear;
    a parking rod that moves along a first direction and an opposite second direction;
    a cam member through which the parking rod passes, the cam member moveable from a first position to a second position in accordance with movement of the parking rod in the second direction, and the cam member including a tapered portion that presses the parking pawl such that the parking pawl is engaged with the parking gear when the cam member moves from the first position to the second position,
    the parking rod including a protruding portion that protrudes from the cam member; and
    a guide member that guides the cam member, the guide member supports and contacts the protruding portion and the tapered portion when the cam member is at the first position.

2. The parking lock device according to claim 1, wherein when the cam member is at the first position, a distal end of the protruding portion is supported by the guide member.

3. The parking lock device according to claim 1, wherein the guide member that supports the protruding portion is subjected to heat treatment.

4. The parking lock device according to claim 1, wherein:
    the guide member includes a straight portion extending along an axial direction of the parking rod and a support portion that is disposed side-by-side with the straight portion in the axial direction of the parking rod, the support portion supports and contacts the protruding portion and the tapered portion when the cam member is at the first position, and the support portion is higher in hardness than the straight portion.

5. The parking lock device according to claim 1, further comprising a collar fitted onto an outer periphery of the protruding portion and the collar is fixed to the parking rod by welding.

6. The parking lock device according to claim 1, wherein:
the first direction and the second direction extend parallel with an axial direction of the parking rod.

\* \* \* \* \*